United States Patent
Joyner et al.

(10) Patent No.: US 6,479,137 B1
(45) Date of Patent: Nov. 12, 2002

(54) CONTROLLED DIRECTIONAL TEAR LAMINATES

(75) Inventors: Patrick K. Joyner, Canandaigua, NY (US); Dan-Cheng Kong, Fairport, NY (US)

(73) Assignee: Exxon Mobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/568,208

(22) Filed: May 9, 2000

(51) Int. Cl.[7] .......................... B32B 7/02; B32B 23/08; B32B 27/08
(52) U.S. Cl. .................... 428/212; 428/476.3; 428/483; 428/511; 428/515; 428/516; 428/523; 428/910
(58) Field of Search ................................ 428/515, 516, 428/511, 910, 212, 34.3, 35.2, 35.7, 35.9, 523, 483, 476.3

(56) References Cited

U.S. PATENT DOCUMENTS

| | | | |
|---|---|---|---|
| RE30,726 E | 9/1981 | Otten et al. ................ | 206/601 |
| 4,680,207 A | 7/1987 | Murray ........................ | 428/35 |
| 4,687,688 A | 8/1987 | Curie et al. .................. | 428/35 |
| 4,820,557 A | 4/1989 | Warren ...................... | 428/34.9 |
| 5,091,241 A | 2/1992 | Lang et al. .................. | 428/213 |
| 5,169,696 A | 12/1992 | Lang et al. ................ | 428/35.2 |
| 5,206,075 A | 4/1993 | Hodgson, Jr. ............... | 428/216 |
| 5,241,030 A | 8/1993 | Barry et al. ............. | 526/348.1 |
| 5,288,531 A | 2/1994 | Falla et al. ................ | 428/35.2 |
| 5,308,668 A | 5/1994 | Tsuji ........................... | 428/43 |
| 5,512,337 A | 4/1996 | Littmann et al. .......... | 428/35.4 |
| 5,589,561 A | 12/1996 | Barry et al. ............. | 526/348.1 |
| 5,654,082 A | 8/1997 | Kagawa ...................... | 428/212 |
| 5,691,070 A | 11/1997 | Watanabe et al. .......... | 428/516 |
| 5,721,025 A | 2/1998 | Falla et al. ................ | 428/35.2 |
| 5,725,962 A | 3/1998 | Bader et al. ................ | 428/515 |
| 5,786,050 A | 7/1998 | Otsuka et al. ............. | 428/35.2 |
| 5,827,615 A | 10/1998 | Touhsaent et al. .......... | 428/463 |
| 5,837,369 A | 11/1998 | Grunberger et al. ........ | 428/349 |
| 5,840,244 A | 11/1998 | Firdaus et al. ............. | 264/565 |
| 5,878,549 A | 3/1999 | Littmann et al. .............. | 53/412 |
| 5,879,768 A | 3/1999 | Falla et al. ................ | 428/35.7 |
| 5,885,707 A | 3/1999 | Kaschel et al. ............. | 428/349 |
| 5,885,721 A | 3/1999 | Su et al. | |
| 5,888,640 A | 3/1999 | Marotta et al. .......... | 428/308.4 |
| 5,912,060 A | 6/1999 | Kishida et al. ............. | 428/35.2 |

FOREIGN PATENT DOCUMENTS

| | | |
|---|---|---|
| EP | 0291098 | 11/1988 |
| EP | 0372886 | 6/1990 |

OTHER PUBLICATIONS

Patent abstracts of Japan vol. 1999, No. 03, Mar. 31, 1999 & JP 10 337828 A (Tamapori KK: Ace Package: KK).
Patent abstracts of Japan vol. 2000, No. 12, Jan. 3, 2001 & JP 2000 238212 A (Tamapori KK).

*Primary Examiner*—Paul Thibodeau
*Assistant Examiner*—Kevin R. Kruer
(74) *Attorney, Agent, or Firm*—Rick F. James; Keith A. Bell

(57) ABSTRACT

The present invention relates to multilayer laminates having controlled directional tearing in both the machine direction (MD) and the transverse direction (TD). It is desirable to have controlled tearing for use in connection with pouches or other packages having a reclose device. The laminate is made up of a biaxially oriented inner layer containing linear low density polyethylene (LLDPE) and having a tensile elongation to break of less than 200% in the MD and less than 150% in the TD, an outer layer having a heat distortion temperature of at least 10° C. higher than the inner layer and a tensile longation to break of less than 200% in the MD and less than 150% in the TD, and an adhesive layer containing an adhesive polymer sandwiched between the inner and outer layers and adhering the two layers to each other.

12 Claims, 3 Drawing Sheets

CONTROLLED DIRECTIONAL TEAR LAMINATES

BACKGROUND OF THE INVENTION

The present invention relates to multilayered laminate films. More specifically, the present invention relates to a multilayered laminate with controlled tearability useful for forming packages or pouches.

Generally, in the preparation of a film from granular or pelleted polymer resin, the polymer is first extruded to provide a stream of polymer melt, and then the extruded polymer is subjected to the film-making process. Film-making typically involves a number of discrete procedural stages including melt film formation, quenching and windup. For a general description of these and other processes associated with film-making, see K R Osborn and W A Jenkins, *Plastic Films: Technology and Packaging Applications*, Technomic Publishing Co., Inc., Lancaster, Pennsylvania (1992).

An optional part of the film-making process is a procedure known as "orientation." The "orientation" of a polymer is a reference to its molecular organization, i.e., the orientation of molecules relative to each other. Similarly, the process of "orientation" is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process requires substantially different procedures. This is related to the different physical characteristics possessed by films made by the two conventional film-making processes: casting and blowing. Generally, blown films tend to have greater stiffness, toughness and barrier properties. By contrast, cast films usually have the advantages of greater film clarity and uniformity of thickness and flatness, generally permitting use of a wider range of polymers and producing a higher quality film.

Orientation is accomplished by heating a polymer to a temperature at or above its glass-transition temperature ($T_g$) but below its crystalline melting point ($T_m$), and then stretching the film quickly. On cooling, the molecular alignment imposed by the stretching competes favorably with crystallization and the drawn polymer molecules condense into a crystalline network with crystalline domains (crystallites) aligned in the direction of the drawing force. As a general rule, the degree of orientation is proportional to the amount of stretch and inversely related to the temperature at which the stretching is performed. For example, if a base material is stretched to twice its original length (2:1) at a higher temperature, the orientation in the resulting film will tend to be less than that in another film stretched 2:1 but at a lower temperature. Moreover, higher orientation also generally correlates with a higher modulus, i.e., measurably higher stiffness and strength.

Biaxial orientation is employed to more evenly distribute the strength qualities of the film in two directions. Biaxially oriented films tend to be stiffer and stronger, and also exhibit much better resistance to flexing or folding forces and tearing, leading to their greater utility in most packaging applications.

Flexible laminate packs are, however, being increasingly used for applications where a pack needs to be opened and reclosed. A current problem is that when tearing the packaging material the tearing is difficult and will propagate tear randomly in an uncontrolled way. This is particularly important when reclosure devices such as zippers, low tack adhesives and press devices, are employed. Frequently scissors and other cutting devices need to be used. Various methods have been proposed to resolve this problem including perforation, scoring and modifications to the closure device to direct the tear.

Films or laminates which can tear in a controlled direction are highly desirable for so called easy-open pouches or stand-up-pouches when a reclose device is included in the pouch. Polyethylene films or laminates are used extensively for such end uses, primarily for cost reasons. However, it appears that most proposed polyethylene films, laminates or coextrusions have, heretofore, been developed for impact and tear resistance rather than for controlled directional tearing.

Examples of such proposed tear resistant films or laminates include the lamination of two monoaxially oriented thermoplastic films, with the directions of orientation essentially at right angles to each other; a thermoplastic laminate for use as a stretch-wrap film consisting of at least two layers, one of which is a low density polyethylene and the other is a linear low density polyethylene; a laminate suitable for making heavy duty bags comprising low density polyethylene films blocked together at 80°–100° C. and below the fusion temperature of the polyethylene, which is indicated as exhibiting greater impact and tear resistance than laminates of similar film formed by a fusion lamination process; a tear resistant laminate film comprising a) a crosslinked core layer consisting of a linear low density polyethylene and b) two crosslinked surface layers, each consisting of a blend of linear low density polyethylene, linear medium density polyethylene and ethylene/vinyl acetate copolymer, where the film has a high degree of orientation in the longitudinal and transverse directions; and a rupture resistant bag capable of being boiled which is made from an oriented multiple layer film consisting of a first layer of nylon 6, a second layer containing a blend of 50–100% linear low density polyethylene and 50–0% low density polyethylene and a third adhesive polymer layer disposed between the first and second layers which contains a substantial fraction of linear low density polyethylene.

Polymeric films or laminates, and packages made therefrom, which tear easily have also been proposed. Most of the proposed so called easy-tear films or laminates, however, generally disclose a film or laminate which can be torn easily in a particular direction.

Reissued Patent Re. 30,726 to Otten et al. discloses a film containing a blend or mixture of polyethylene and an ionomer resin which is blow extruded and stretched in the direction of extrusion. The film is indicated as having excellent linear tear properties in the direction of extrusion.

U.S. Pat. No. 5,091,241 to Lang et al. discloses a multilayer laminate consisting of a machine direction oriented linear low density polyethylene film and a sealant film made from a polyethylene resin, adhesively laminated to at least one side of the oriented film. The film, or pouches made therefrom, is indicated as being transversely tearable.

U.S. Pat. No. 5,308,668 to Tsuji discloses a multilayer film in which at least one layer contains a mixture of two or more isomeric resins which have poor compatibility with respect to each other and a large difference in melting point. The film is indicated as having an easy-to-tear characteristic in a certain direction, where the isomeric resins form numberless phases in the direction of tear.

U.S. Pat. No. 5,786,050 to Otsuka et al. discloses a multilayer laminated film pouch, wherein the film is composed of an innermost film containing linear low density polyethylene, an intermediate film made of an oriented polyolefin and an outermost film made of biaxially oriented nylon and/or PET. The pouch is indicated as having an easy opening characteristic.

It would be highly desirable to have a film with controlled tearing in the machine direction (MD) and/or the transverse direction (TD) that will allow easy and controlled pack opening. The use of such a film is particularly advantageous for stand-up-pouches (SUP) when a reclose devise is used.

SUMMARY OF INVENTION

According to the present invention, a laminate having controlled directional tear characteristics suitable for use in packages or pouches is provided.

More specifically, the present invention relates to providing a controlled directional tear laminate which includes:

(a) a biaxially oriented inner layer containing LLDPE and having a tensile elongation to break of less than 200% in the MD and less than 150% in the TD;

(b) an outer layer having a heat distortion temperature of at least 10° C. higher than the inner layer and a tensile elongation to break of less than 200% in the MD and less than 150% in the TD; and (c) an adhesive layer containing an adhesive polymer, the adhesive layer being between the inner and outer layers and adhering the inner and outer layers to each other.

In one embodiment the biaxially oriented inner layer can be a multilayer film itself having a metallizable skin layer, a sealable skin layer and a core layer, the core layer being between the metallizable skin layer and the sealable skin layer. In such an embodiment, the metallizable skin layer can be selected from an ethylene-propylene copolymer, an ethylene-propylene-butene terpolymer, a butylene-propylene copolymer, an ethylene α-olefin copolymer or mixtures thereof. The sealable skin layer can be selected from a metallocene polyethylene plastomer, a metallocene LLDPE, a Ziegler Natta catalyzed plastomer, VLDPE, ULDPE and mixtures thereof. The core layer will contain LLDPE and can also contain at least one ethylene α-olefin copolymer having a density from 0.91 to 0.94 g/cm$^3$, a $C_3$ to $C_{12}$ α-olefin comonomer and up to about 20 wt % of an additive selected from a propylene-ethylene copolymer, a propylene-butylene copolymer, an ethylene-propylene-butene terpolymer, polypropylene and mixtures thereof.

In another embodiment, the inner layer multilayer film can also contain a first intermediate (or tie) layer between the metallizable skin layer and the core layer and a second intermediate (or tie) layer between the sealable skin layer and the core layer. In such an embodiment, the intermediate (or tie) layers can contain a blend of 50 to 100 weight % of a material or materials useful for the core layer and up to 50 weight % of a material or materials useful for the metallizable skin layer.

In yet another embodiment, the present invention includes an inner layer which is oriented from about 1.2 to 6 times in the MD and from about 6 to 10 times in the TD.

In another aspect, the outer layer is selected from paper, foil, polyester, polyamide, polypropylene, HDPE or a lamination of these materials and the adhesive layer is selected from polyurethane, polyethylene or an ethylene copolymer.

The present invention provides laminates having the advantage of controlled tearing in the machine direction (MD) and/or the transverse direction (TD) that will allow easy and controlled pack opening. Such laminates are advantageously used in connection with pouches or other packages having a reclose device.

Additional objects, advantages and novel features of the invention will be set forth in part in the description and examples which follow, and in part will become apparent to those skilled in the art upon examination of the following, or may be learned by practice of the invention. The objects and advantages of the invention may be realized and attained by means of the instrumentalities and combinations particulary pointed out in the appended claims.

DETAILED DESCRIPTION OF INVENTION

In accordance with the invention, a multilayer laminate is provided which is characterized by controlled directional tearing. The term "controlled directional tearing" as used herein refers to straight line tearing of the laminate film of the invention in the machine direction (MD), the transverse direction (TD) or both the MD and TD upon applying a tearing force to the film. The laminate film will exhibit controlled directional tearing as a film or in the form of a package, e.g. a formed pouch.

Figure 1:
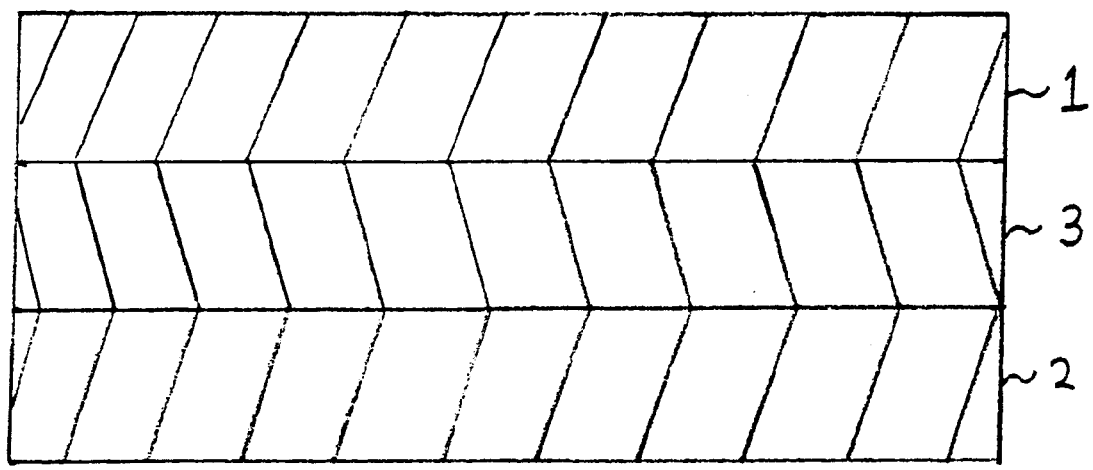
FIG. 1 is a cross-section of a laminate of this invention.

FIG. 1 shows a cross-section of a three layer laminate sheet material in accordance with this invention. Layer 1 is a biaxially oriented inner layer which contains linear low density polyethylene (LLDPE) and has a tensile elongation to break of less than 200% in the MD and less than 150% in the TD. Layer 2 is an outer layer having a heat distortion temperature of at least 10° C. higher than the inner layer and a tensile elongation to break of less than 200% in the MD and less than 150% in the TD. Layer 3 is an adhesive layer containing an adhesive polymer, the adhesive layer being between the inner and outer layers and adhering the layers to each other.

Inner Layer

The inner layer, i.e., the layer which forms an inside wall of an enclosure such as a pouch, is a biaxially oriented film containing linear low density polyethylene (LLDPE) and having a tensile elongation to break of less than 200% in the MD and less than 150% in the TD.

The term "linear low density polyethylene" (LLDPE) as used herein is defined to mean a copolymer of ethylene and a minor amount of an olefin containing 3 to 12 carbon atoms, having a density of from about 0.910 to about 0.940 and a melt index (MI) of from about 0.5 to about 10. (Melt index is expressed as g/10 min.) (Density (d) is expressed as g/cm$^3$.) Methods for determining MI are known in the art, e.g., ASTM D 1238. LLDPE is readily available, e.g., Dowlex™ 2045.03 (MI=1.1, d=0.920) from Dow Chemical Company, Midland, Michigan.

The inner layer can be a multi-layer film which is coextruded or a laminate of multiple layers. Multi-layer film as used herein means a film having more than one layer of material which forms the inner layer of the final laminate product. Generally, the multilayer film of the inner layer is a three or five layer structure having a total thickness of about 20 to 200 microns, preferably about 25 to 50 microns.

Figure 2:
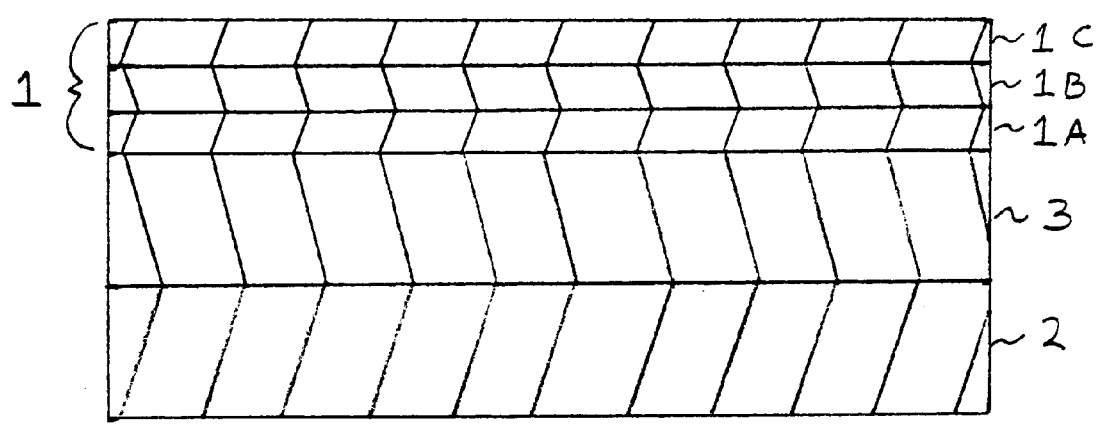
FIG. 2 is a cross-section of a laminate of this invention which contains a 3 layer biaxially oriented inner layer film.

FIG. 2 shows a cross-section of a laminate sheet material in accordance with this invention, in which the inner layer is a 3 layer film. The inner layer 1 is a 3 layer film containing a metallizable skin layer 1A, a core layer 1B and a sealable skin layer 1C. The outer layer 2 and the adhesive layer 3 are of the same structure as in FIG. 1. In such a structure, having a 3 layer film for an inner layer, the metallizable skin layer will be about 1 to 5 microns, preferably 1 to 2 microns; the sealable skin layer will be about 1 to 5 microns, preferably 1 to 3 microns; and the core layer will be about 18 to 190 microns, preferably 23 to 45 microns.

Figure 3:
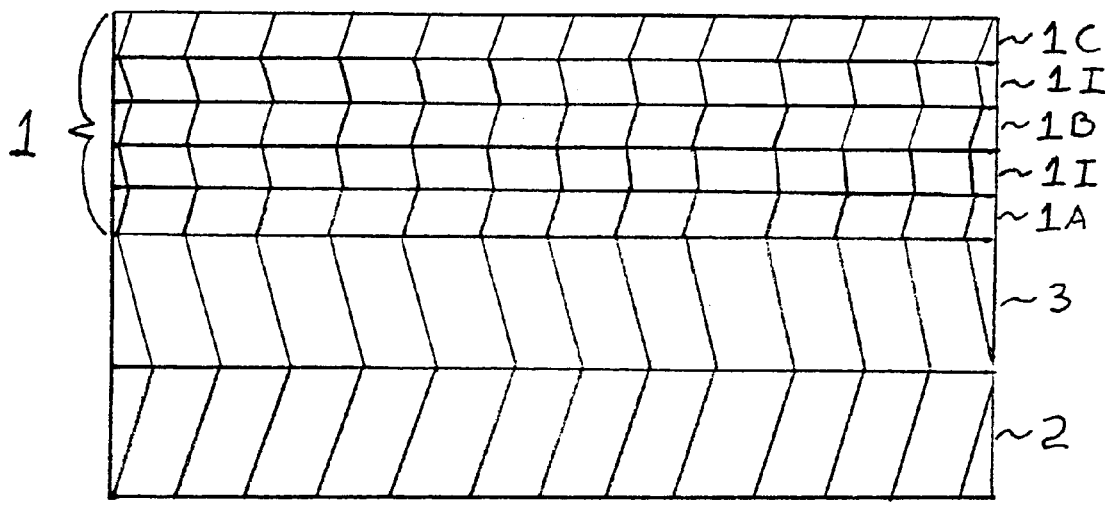
FIG. 3 is a cross-section of a laminate of this invention which contains a 5 layer biaxially oriented inner layer film.

FIG. 3 shows a cross-section of a laminate sheet material in accordance with this invention, in which the inner layer is a 5 layer film. The inner layer 1 is a 5 layer film containing a metallizable skin layer 1A, a core layer 1B, a sealable skin layer 1C and intermediate (or tie) layers 1I between the core layer 1B and each of the skin layers (1A and 1C) respectively. In such a structure having a 5 layer film for an inner layer, the metallizable skin layer will be about 1 to 5 microns, preferably 1 to 2 microns; the sealable skin layer will be about 1 to 5 microns, preferably 1 to 3 microns; the core layer will be about 17 to 180, preferably 21 to 40 microns; and the intermediate (or tie) layers will be about 1 to 10 microns, preferably 2 to 5 microns.

The core layer of a multi-layer film inner layer will contain conventional (Ziegler Natta -type) LLDPE or a blend of from about 70 to about 99 wt. % conventional LLDPE and from about 1 to about 30 wt. % metallocene produced LLDPE (mLLDPE) having a density in the range of from about 0.91 to about 0.95 g/cm$^3$.

The core layer will also typically include at least one LLDPE α-olefin copolymer having a density from about 0.91 to 0.94 g/cm$^3$ and a $C_3$ to $C_{12}$ α-olefin comonomer. The core layer can also include up to about 20% by weight, preferably from about 5 to 10 weight %, of an extrusion processing additive to improve extrusion processability, i.e. to reduce the extrusion melt pressure. Suitable additives include a propylene-ethylene copolymer, a propylene-butylene copolymer, an ethylene-propylene-butene terpolymer, polypropylene and mixtures thereof.

The metallizable skin layer of a multi-layer film inner layer can contain an ethylene-propylene copolymer, a butylene-propylene copolymer, an ethylene-propylene-butene terpolymer, an ethylene α-olefin copolymer or mixtures of these. The α-olefin is preferable selected from the group consisting of propylene, 1-butene, 1-isobutene, 4-methyl-1-pentene, 1-pentene, 1-isopentene, 1-hexene, 1-octene, 1-nonene, 1-isononene, 1-decene and 1-isodecene, with 1-octene being the most preferred.

In another embodiment the metallizable skin layer can be a copolyester derived from 50 to 99 mol %, based on the total moles of acids, of terephthalic acid; 1 to 25 mol %, based on the total moles of acids, of an aliphatic dicarboxylic acid; 0 to 25 mol %, based on the total moles of acids, of an aromatic dicarboxylic acid; 70 to 100 mol %, based on the total moles of diols, of ethylene glycol; and 0 to 30 mol %, based on the total moles of diols, of a diol selected from the group of neopentyl glycol, 1,4-butanediol, trimethylene glycol, tetramethylene glycol or 1,4-cyclohexane dimethanol. In such a case, where the metallizable skin layer is a copolyester, the inner layer will also typically include a tie layer (or intermediate layer) between the metallizable skin layer and the core layer. The tie layer will typically contain anhydride modified ethylene methacrylate.

In the case of a laminate structure having a 5 layer film inner layer, the laminate will typically include a core layer as described above and 2 intermediate (or tie) layers with one intermediate layer between the core layer and the metallizable skin layer and the other intermediate layer between the core layer and the sealable skin layer. The intermediate layers can be a blend of from 50 to 100 weight % of a material or materials suitable for use as the core layer and up to 50 weight % of a material or materials suitable for use as the metallizable skin layer.

The sealable skin layer of a multi-layer inner layer can include a metallocene polyethylene plastomer, a metallocene LLDPE, a Ziegler Natta catalyzed plastomer, very low density polyethylene (VLDPE), ultra low density polyethylene (ULDPE) or mixtures thereof.

Metallocene polymers or plastomers refer to polymers or plastomers prepared using a class of well known highly active olefin catalysts known as metallocenes. These catalysts, particularly those based on group IV B transition metals such as zirconium, titanium and hafnium, show high activity in ethylene polymerization. The metallocene catalysts are also flexible in that, by manipulation of catalyst composition and reaction conditions, they can provide polyolefins with controllable molecular weights, as low as about 200 up to about 1 million or higher, and molecular weight distribution, from extremely narrow to broad.

Exemplary of the development of metallocene catalysts for the polymerization of ethylene is found in U.S. Pat. No. 4,937,299 to Ewen et al., hereby incorporated by reference.

Metallocene catalysts are usefull in making controlled ultrauniform and super random specialty copolymers. For example, if a lower density ethylene copolymer is made with a metallocene catalyst, such as very low density polyethylene (VLDPE), an ultra uniform and super random copolymerization will occur, as contrasted with the polymer produced by copolymerization using a conventional Ziegler catalyst.

A preferred metallocene polyethylene plastomer useful for the sealable skin layer is Dow Affinity PL 1840 with a density of 0.909 g/cm$^3$ and a 1.0 melt flow index and a preferred metallocene LLDPE useful for this layer is Exxon Exceed 350 D60 with a density of 0.917 g/cm$^3$ and a 1.0 melt flow index.

In addition to the metallocene polymers discussed above, the sealable layer can contain polymers catalyzed using a Ziegler-Natta type catalyst, as is well known in the art. The sealable layer can also contain VLDPE and ULDPE. VLDPE polymers include polymers typically having a melt index of 0.5 to 10 and a density as high as 0.91 g/cm$^3$, usually in the range 0.87–0.91 g/cm$^3$. ULDPE polymers include polymers typically having a melt index of 0.5 to 10 and a density as high as 0.919 g/cm$^3$, usually in the range 0.905 to 0.919 g/cm$^3$.

A preferred sealable skin layer contains Eastman MX STEN CM 756-X with a density of 0.91 g/cm$^3$ and a melt flow index of 0.9.

Orientation

The inner layer film can be oriented biaxially by stretching the film 1.2 to 6 times, preferably 2 to 5 times, in the machine direction (MD), and 6 to 10 times, preferably 6 to 8 times, in the transverse direction (TD). Most biaxial orientation processes use an apparatus which stretches the film sequentially, first in one direction and then in the other. A typical apparatus will stretch a film in the MD first and then in the TD. The degree to which a film can be stretched is dependent upon several factors including, for example, the polymer from which a film is made. For further discussion concerning biaxial orientation, see U.S. Pat. No. 5,885,721 and U.S. application Ser. No. 08/715,546, which are incorporated herein by reference for all that they disclose.

During the process of biaxial orientation, a cast material is typically heated (optionally including a pre-heating stage) to its orientation temperature and subjected to MD orientation between two sets of rolls, the second set rotating at a greater speed than the first by an amount effective to obtain the desired draw ratio. Then, the monoaxially oriented sheet is oriented in the TD by heating (again optionally including pre-heating) the sheet as it is fed through an oven and subjected to transverse stretching in a tenter frame.

The biaxial orientation can also be carried out simultaneously by orienting on a line which utilizes linear motors to directly propel opposed pairs of tenter clips synchronously. The use of linear motors to directly propel tenter clips to effect simultaneous biaxial stretching is disclosed in U.S. Pat. No. 4,853,602 to Hommes et al., the contents of which is incorporated herein by reference.

The biaxial orientation of the substrate, including any preheating step as well as the stretching steps, can be performed using stretch temperatures in the range of from above the glass transition temperature (Tg) of the substrate to near the crystalline melting point (Tm) of the substrate. More specifically, orientation in the MD is conducted at from about 70° C. to about 130° C., more preferably from about 70° C. to about 120° C. The film is typically heat set to a temperature between about 70 and 100° C. after the MD orientation. The film is then reheated and stretched in the TD. Orientation in the TD is conducted at from about 120° C. to about 150° C., more preferably from about 120° C. to about 140° C. The skilled artisan will understand that the orientation temperature employed in a particular situation will generally depend upon the residence time of the base sheet and the size of the rolls. Apparatus temperature higher than the Tm of the polyolefin sheet can be appropriate if the residence time is short. The skilled artisan also understands that the temperatures involved in these processes are in relation to the measured or set temperatures of the equipment rather than the temperature of the polyolefin itself, which generally cannot be directly measured.

The film thickness of the inner layer after orientation can range from about 20 to 100 microns (0.8 to 4 mils), preferably 25 to 80 microns (1 to 2 mils). The resulting inner layer will have a tensile elongation to break ratio of less then 200% in the MD and less than 150% in the TD.

Metallized Film

After biaxially orienting the inner layer, a metallized coating can be applied to the surface of the metallizable layer. Advantageously, this surface may be treated to improve its receptivity to the metallized coating. A preferred treatment involves treating the surface to a surface tension level of at least about 35 dynes/cm and preferably from 38 to 45 dynes/cm in accordance with ASTM Standard D2578-84. The treatment can be flame treatment, plasma treatment, chemical treatment or corona discharge treatment. Flame treatment and corona discharge treatment are preferred, and corona discharge treatment is most preferred. The metallized coating may be applied by any of known methods, for example electroplating, sputtering and vacuum metallizing. A preferred method of metallizing is to first treat the metallizable layer by corna discharge and then apply the metal coating by vacuum vapor deposition. The metal coating may be of typical metals such as aluminum, copper, silver, gold, tin and chromium. The preferred metal is aluminum.

Outer Layer

The outer layer can be any suitable material which has a heat distortion temperature of at least 10° C. higher than the inner layer and a tensile elongation to break ratio of less than 200% in the MD and less than 150% in the TD. The outer layer material of the laminate is typically selected to enhance barrier properties and machinability for pouch forming or other packaging machines.

The outer layer is preferably selected from paper, foil, polyester, polyamide, polypropylene, high density polyethylene (HDPE) or a lamination of at least two thereof. An outer layer containing one or more of the polymeric materials may be oriented or non-oriented, depending upon the desired overall film characteristics.

Adhesive Layer

The adhesive layer contains an adhesive polymer which is disposed between the inner and outer layers and is capable of adhering these layers together.

Preferably, the adhesive polymer is preferably selected from a polyurethane, polyethylene or an ethylene copolymer. The adhesive will typically be applied or coated by an extrusion lamination process where the adhesive is sandwiched between the inner and outer layers. The adhesive will preferably be extruded or coated on one surface of the outer layer film, contacted with the metallizable or metallized skin layer of the inner layer and then passed through nip rollers to improve the surface contact and adhesion of the adhesive to the inner and outer layers.

Pouch Construction

The laminates of the present invention can be formed into pouches or other packages according to methods known in the art, such as by running the laminate through a Bartelt horizontal four sides seal pouch machine or a Hayssen vertical form fill and seal packaging machine. The inner layer will form the inner surface of the pouch or package and the outer layer will form the outer surface. The laminate film can suitably be positioned so that the side seal zone of a pouch or package formed from the film is parallel with either the MD or TD.

The multilayer laminate films of the present invention which can tear in a controlled direction (i.e., straight line tearing in the MD, TD or both the MD and TD) are highly desirable for so called easy open pouches or stand-up-pouches having a reclose device, such as zippers, low tack adhesives or press devices.

The multilayer films of the present invention are particularly useful in packaging having a zipper closure. U.S. Pat. Nos. 5,152,613; 5,020,194; and 5,007,143, incorporated herein by reference, describe the use of zippers for thermoplastic bags.

Controlled directional tearing provides easy opening along the tear direction by hand for hermetic seal packaging. The controlled directional tear prevents z-direction tear, which destroys the bag during opening. A reclosable zipper is fastened on the biaxially oriented multilayer laminate films of the present invention during packaging. The reclosable zipper is generally located inside the bag below the top seal zone or above the bottom seal zone and is in parallel to the top or bottom seal direction. The reclosable device, e.g., Zipper, can suitably be parallel with either the machine direction or transverse direction of the laminate film. When the bag is opened, the seal zone above the zipper is torn unidirectionally by hand in the bag. The bag can then be resealed with the zipper. Typically, a notch will be made in the side seal zone at a desired location to help initiate the controlled direction tear. Unoriented LLDPE films, such as cast LLDPE or blown LLDPE, do not have controlled directional tearing and require a knife or scissors to cut the bag in order to use a reclosable zipper.

EXAMPLES

The following non-limiting examples have been carried out to illustrate preferred embodiments of the invention. These examples include the preparation of four laminates according to the invention, the construction of packages using these laminates and evaluation of the tearability of the packages.

Example 1

In this example a laminated film structure was prepared from a 3 layer coextruded biaxially oriented inner layer laminated with an adhesive to a 12 μm thick commerical polyester film outer layer. The 3 layer coextruded biaxially oriented inner layer was of the structure A/B/C, in which the B core layer was a blend of 95% by weight of a linear ethylene-octene copolymer, having a density of about 0.92 g/cm$^3$, and 5% by weight of an ethylene-propylene copolymer, with 95% propylene and having a density of about 0.89 g/cm$^3$; the A metallizable skin layer was an ethylene-propylene copolymer with 95% propylene having a density of 0.89 g/cm$^3$; and the C sealable skin layer was a metallocene polyethylene having a density of 0.909 g/cm$^3$. The coextruded inner layer was oriented 4.5 times in the MD and 7 times in the TD by tenter frame orientation. The resulting total film thickness was about 200 gauge (50 μm) and each skin layer was about 5 gauge (1.25 μm).

The laminate was then produced by an extrusion lamination process where a polyethylene adhesive having a density of about 0.922 g/cm$^3$ was extruded between the metallizable skin layer side of the inner layer and the outer layer. The laminate was passed through nip rollers to press the inner and outer layers together and to sandwich the adhesive between the layers. The total thickness of the laminate was approximately 318 gauge (80 μm), with the inner layer about 200 gauge (50 μm) and the outer layer about 48 gauge (12 μm).

The resulting laminate was then run through a Bartelt horizontal four sides seal pouch machine. A notch was made on the side seal zone and when a tearing force was applied on the notch, a straight line tear propagation was achieved.

Example 2

In this example a laminated film structure was prepared from a metallized 3 layer coextruded biaxially oriented inner layer laminated with an adhesive to a 12 μm thick commerical polyester film outer layer. The inner layer was of the same structure as in Example 1, except that the A metallizable skin layer was first subjected to corona discharge treatment and then metallized with an aluminum coating applied by vacuum vapor deposition. The aluminum coating was present in an amount of about 200–500 Angstroms.

The metallized inner layer was laminated to the polyester outer layer by the polyethylene adhesive as in Example 1.

The resulting laminate was then run through the Bartelt horizontal four sides seal pouch machine. As in Example 1, a notch was made on the side seal zone and then tearing was initiated at the notch, a straight line tear propagation was achieved.

Example 3

In this example a laminated film structure was prepared from a 3 layer coextruded biaxially oriented inner layer laminated with an adhesive to a 12 μm commercial polyester film outer layer. The 3 layer coextruded biaxially oriented inner layer had the same structure as Example 1, except that the tenter frame orientation was 1.35 in the MD and 8.0 in the TD.

The laminate was otherwise produced by the same process as in Example 1.

The resulting laminate was then run through a Hayssen Vertical Form Fill and Seal packaging machine. As in Example 1, a notch was made on the Side Seal zone and when tearing was initiated at the notch, a straight line tear propagation was achieved.

Example 4

In this example a laminated film structure was prepared from a 5 layer coextruded biaxially oriented inner layer laminated with an adhesive to a 12 μm thick commercial polyester film outer layer. The 5 layer coextruded biaxially oriented inner layer was of the structure A/B/C/B/D, in which the C core layer was a blend of 95% by weight of LLDPE, having a density of about 0.920 g/cm$^3$ and a melt flow index of about 1.0, and 5% by weight of an ethylene-propylene copolymer, with 95% propylene, having a density of about 0.89 g/cm$^3$; the B intermediate layers were a blend of 80% by weight of LLDPE, having a density of about 0.920 g/cm$^3$ and a melt flow index of about 1.0, and 20% by weight of an ethylene-propylene copolymer, with 95% propylene having a density of about 0.89 g/cm$^3$; the A metallizable skin layer was an ethylene-propylene copolymer with 95% propylene; and the D Sealable skin layer was a metallocene polyethylene having a density of 0.909 g/cm$^3$. The coextruded inner layer was oriented 4.5 times in the MD and 7.0 times in the TD by tenter frame orientation. The resulting total film thickness was about 200 gauge (50 μm).

The laminate was produced by an extrusion lamination process where a polyethylene adhesive having a density of about 0.922 g/cm$^3$ was extruded between the metallizable skin layer side of the inner layer and the outer layer. The laminate was passed through a pair of nip rollers to press the inner and outer layers together and to sandwich the adhesive between these layers. The total thickness of the resulting laminate was approximately 300 gauge (76 μm), with the inner layer about 200 gauge (50 μm) and the outer layer about 48 gauge (12 μm).

The resulting laminate was then run through a Bartelt horizontal four sides seal pouch machine. A notch was made on the side seal zone and when tearing was initiated at the notch, a straight line tear propagation was achieved.

Thus, while there has been disclosed what is presently believed to be the preferred embodiments of the invention, those skilled in the art will appreciate that other and further changes and modifications can be made without departing from the scope or spirit of the invention, and it is intended that all such other changes and modifications are included in and are within the scope of the invention as described in the appended claims.

We claim:

1. A controlled directional tear laminate, said laminate comprising:
   (a) a biaxially oriented inner film comprising LLDPE and having a tensile elongation to break of less than 200% in the MD and less than 150% in the TD;
   (b) an outer film having a heat distortion temperature of at least 10° C. higher than the inner layer and a tensile elongation to break of less than 200% in the MD and less than 150% in the TD; and
   (c) an adhesive layer comprising an adhesive polymer, said adhesive layer being between said inner and outer films and adhering said inner and outer films to each other.

2. A laminate of claim 1, wherein said controlled directional tearing is in the MD, TD or both MD and TD.

3. A laminate of claim 1, wherein said biaxially oriented inner film is a multilayer film comprising a metallizable skin layer, a sealable skin layer and a core layer, said core layer comprising LLDPE and being between said metallizable skin layer and said sealable skin layer.

4. A laminate of claim 3, wherein said metallizable skin layer is selected from the group consisting of an ethylene-propylene copolymer, butylene-propylene copolymer, ethylene-propylene-butene terpolymer, ethylene α-olefin copolymer, polyester copolymer and mixtures thereof.

5. A laminate of claim 3, wherein said core layer further comprises at least one ethylene α-olefin copolymer having a density from 0.91 to 0.94, a $C_3$ to $C_{12}$ α-olefin comonomer and up to about 20% by weight of an additive selected from the group consisting of a propylene-ethylene copolymer, propylene-butylene copolymer, ethylene-propylene-butene terpolymer, polypropylene and mixtures thereof.

6. A laminate of claim 3, wherein said sealable skin layer is selected from the group consisting of a metallocene polyethylene plastomer, metallocene LLDPE, Ziegler Natta catalyzed plastomer, VLDPE, ULDPE and mixtures thereof.

7. A laminate of claim 3, wherein said multilayer film further comprises a first intermediate layer between said metallizable skin layer and said core layer and a second intermediate layer between said sealable skin layer and said core layer, said intermediate layers comprising a blend 50 to 100 weight % of a material or materials suitable for use in said core layer and up to 50 weight % of a material or materials suitable for use in said metallizable layer.

8. A laminate of claim 3, wherein said metallizable skin layer is metallized.

9. A laminate of claim 1, wherein said inner film is oriented from about 1.2 to 6 times in the MD and from about 6 to 10 times in the TD and has a thickness of from about 20 to 200 microns.

10. A laminate of claim 1, wherein said outer film is selected from the group consisting of paper, foil, polyester, polyamide, polypropylene, HDPE and a lamination of at least two thereof.

11. A laminate of claim 1, wherein said adhesive layer is selected from the group consisting of polyurethane, polyethylene and an ethylene copolymer.

12. A laminate of claim 3, wherein said multilayer film is coextruded.

* * * * *